MEANS FOR NEUTRALIZING FEEDBACK IN A RADIO AMPLIFIER
Filed March 17, 1949
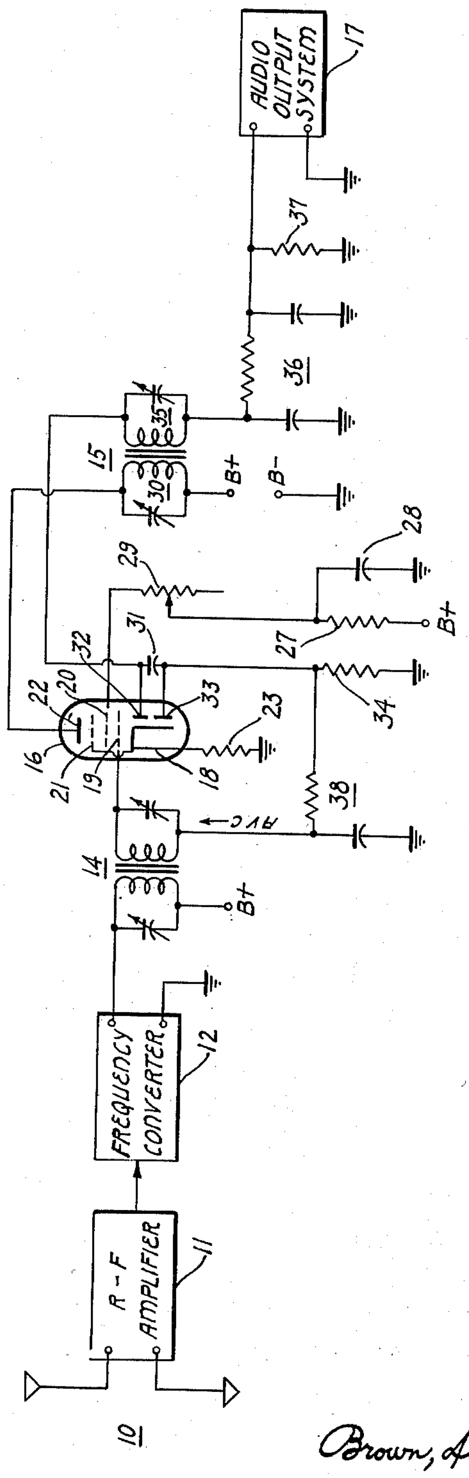
INVENTOR.
ROBERT C.A. ELAND
BY
Brown, Fink & Lynnestvedt
AGENTS Patented Aug. 1, 1950 2,517,294

UNITED STATES PATENT OFFICE 2,517,294

MEANS FOR NEUTRALIZING FEEDBACK IN A RADIO AMPLIFIER

Robert C. A. Eland, Philadelphia, Pa., assignor to Philco Corporation, Philadelphia, Pa., a corporation of Pennsylvania Application March 17, 1949, Serial No. 81,931

3 Claims. (Cl. 250—20)

This invention relates to an improved method of and means for neutralizing feedback in an R.-F. or I.-F. amplifier stage of a radio apparatus.

It is well known that, for a radio receiver to have a symmetrical frequency-response characteristic, some form of neutralization is ordinarily required to be provided in the R.-F. and/or I.-F. amplifier stages, and that in the absence of neutralization, a non-symmetrical frequency-response characteristic is ordinarily obtained. The reason is that, at frequencies above and below the center or resonant frequency, the feedback to the input grid, through the plate-to-grid interelectrode capacitance, is either degenerative or regenerative depending upon whether the frequency involved is above or below the resonant frequency.

I have discovered a new and simple method of neutralizing feedback. That the neutralization is highly effective, is evidenced by the excellent symmetry of the frequency-response characteristic.

In accordance with my invention, the neutralizing energy is fed back to the input grid through a path which includes the interelectrode capacitance existing within the tube envelope between the input grid and an electrode which is not part of the amplifier section of the tube. While a separate electrode may be specially provided, it frequently happens that an already-existent electrode is available for the purpose. This is the case, for example, where diode elements are contained in the same tube envelope with pentode or tetrode amplifier elements. Examples of such cases include the 6FS7 diode pentode, the 6B7, 6B8 and 7E7 duplex-diode pentodes, and others.

When tubes of the above and similar types are employed in a radio receiver, as for example in the final I.-F. amplifier stage, neutralization of feedback may, in accordance with my invention, be accomplished in a very simple yet highly effective manner.

It is an object then of this invention to provide an improved method of and means for neutralizing feedback in an R.-F. or I.-F. amplifier stage of a radio apparatus.

It is another object of this invention to provide neutralizing means which utilizes the interelectrode capacitance existing within the envelope of an R.-F. or I.-F. amplifier tube between the input grid and an electrode present within the tube envelope but not part of the amplifier section of the tube to return neutralizing energy to the input grid.

It is a more specific object of this invention to provide simple means for effecting neutralization of feedback in an R.-F. or I.-F. amplifier stage wherein is employed a multipurpose tube having, in addition to an amplifier section, one or more diode sections for detection, automatic volume control (AVC) or other purposes.

It is another specific object of this invention to provide, in a radio receiver having a diode pentode or a duplex-diode pentode in an R.-F. or I.-F. amplifier stage, means for utilizing the interelectrode capacitance between the input grid and the diode anode (or anodes) for returning neutralizing energy to the input grid.

These and other objects, features and advantages of the present invention, and the manner in which the objects are attained, will be best understood from a consideration of the following detailed description and of the accompanying single figure of drawing wherein is shown schematically a circuit which utilizes the present invention in a final I.-F. amplifier stage comprising a duplex-diode pentode.

Referring now to the drawing, there is shown a radio receiver comprising an antenna 10, an R.-F. amplifier 11, a frequency converter 12, a first I.-F. transformer 14, a second I.-F. transformer 15, a duplex-diode pentode 16 functioning as a combined I.-F. amplifier, detector, and automatic-volume-control (AVC) tube, and an audio output system 17.

The pentode section of tube 16 functions as the I.-F. amplifier and comprises cathode 18, control grid 19, screen grid 20, supressor grid 21 and plate 22.

With the exception of resistor 29, added by the present invention to the screen-grid circuit for a purpose to be explained, the circuit connections of the pentode section of tube 16 are entirely conventional. Cathode 18 is connected to ground, as by way of the cathode-biasing resistor 23. Control grid 19 is connected to the high-potential side of the tuned secondary of first I.-F. transformer 14. Screen grid 20 is connected to a source of positive supply voltage, B+, by way of the above-mentioned resistor 29 and the usual voltage-dropping resistor 27. Capacitor 28 is the customary radio-frequency bypass capacitor. Suppressor grid 21 is connected to cathode 18. Plate 22 is connected, by way of primary tank circuit 30 of second I.-F. transformer 15, to the source of positive supply voltage, B+.

In Figure 1, the lower diode of tube 16 is employed as an AVC diode while the upper diode is employed as a detector diode. The connections to, and actions of, the AVC and detector diodes are conventional and will be but briefly described. Capacitor 31 is the usual R.-F. bypass capacitor coupling anode 32 of the detector diode to anode 33 of the AVC diode. Cathode 18 is maintained, by the cathode-biasing resistor 23, at a positive potential relative to the AVC-diode anode 33, and a delayed AVC voltage is developed in known manner and applied, by way of the secondary of I.-F. transformer 14, to control grid 19.

Detector diode 32 is, in accordance with my invention, connected to the secondary tuned circuit 35 in a particular manner which I have found to be important to neutralization. The effect thereof upon the action of the upper diode as a detector is, however, unimportant, and the detecting action remains unchanged and conventional. The modulated I.-F. signal voltage induced in the secondary tuned circuit 35 of I.-F. transformer 15 is rectified by the upper diode, and filtered by network 36, thus to produce an audio signal voltage across resistor 37 for application to the audio output system 17.

In order that the frequency-response characteristic of the I.-F. amplifier system may be symmetrical with respect to the center frequency, the system must include some means neutralizing the energy fed back through the plate-to-grid capacitance of the tube. For, as indicated previously, the feedback is degenerative at frequencies on one side of the center frequency and is regenerative for frequencies on the other side. Various means have, of course, been employed by the prior art to effect neutralization, but none, of which I have knowledge, is as simple as the means provided by the present invention.

During the course of some tests and experiments upon a radio receiver which employed a duplex-diode pentode in the final I.-F. stage, I discovered that the manner in which the I.-F. transformer was wound and/or connected had an important effect upon feedback. I discovered that, for the circuit shown in the drawing, when the transformer 15 was wound and connected in a capacity-aiding sense, the energy which returned to the input grid through the diode anode-to-grid interelectrode capacitance opposed the energy fed back through the plate-to-grid interelectrode capacitance, but that when the transformer was connected in a capacity-bucking sense, the energy which returned through the diode anode-to-grid capacitance added to and augmented the energy fed back through the plate-to-grid capacitance.

It will be understood that I have used the term "connected in a capacity-aiding sense" to indicate that the transformer is so wound and connected that the energy transferred from the primary to the secondary through the distributed capacitance of the windings is in such phase as to add to the energy transferred through the mutual inductive coupling, while the term "connected in a capacity-bucking sense" indicates that the energy transferred through the distributed capacitance is in phase-opposition to, though not necessarily 180° out-of-phase with, that transferred through the mutual inductive coupling.

I found that, when the I.-F. transformer 15 was connected in the capacity-aiding sense, the energy which returned to the input grid of duplex-diode pentode 16 by way of the diode anode-to-grid interelectrode capacitance was in excess of that required to counterbalance the plate-to-grid feedback. Apparently, this was due to the fact that, in a duplex-diode pentode, the diode anode-to-grid capacitance is considerably larger than the plate-to-grid capacitance.

To counterbalance the excessive amount of energy which, as described above, returned to the input circuit through the diode anode-to-grid capacitance, I provided means to increase the feedback through the plate-to-grid capacitance. The means conveniently took the form of a resistance 29 inserted in the screen-grid circuit, the effect of which was to place a small A.-C. component of voltage upon screen grid 20. By selecting the proper value for resistance 29, the energy fed back to input grid 19 through the plate-to-grid capacitance can be increased to the extent necessary to balance out the excessive energy reaching the input grid by way of the diode anode-to-grid capacitance. The convenient way of determining when the two feedbacks counterbalance each other is to observe the frequency-response characteristic of the amplifier system. A characteristic which is symmetrical with respect to the resonant frequency indicates that the system is neutralized.

While I prefer to equalize the energy fed back through the two paths by means of a resistance 29 inserted in the screen-grid circuit, it should be understood that other means may also be employed. For example, the energy returned through the diode anode-to-grid capacitance may be reduced to the desired extent by tapping down on secondary 35, or by reducing the turns-ratio of the transformer.

It should also be understood that my invention is not limited to the specific arrangement shown in the drawing wherein two diodes are contained in the tube envelope, one being employed for detection and the other for AVC. My invention is equally applicable to situations where there is only one diode in the amplifier tube, or where there are two diodes but both are employed for AVC purposes. The latter is customary, for example, where AVC voltages having different delays are desired, one of which is for application to the radio-frequency stages, and the other of which is for application to the intermediate frequency stages. In such case, the detector diode is in the following stage, usually in the same tube with the audio amplifier.

If desired, in cases where a duplex-diode pentode (or tetrode) is used, the neutralizing energy may be fed back through but one of the two diodes, in order to reduce or avoid the return of an excessive amount of neutralizing energy.

In the claims which follow the term "radio-frequency" is intended to include intermediate frequencies as well as higher radio frequencies.

Having described my invention, I claim:

1. In a radio receiver employing: a tube having a multi-grid radio-frequency amplifier section and a diode section within its envelope, a radio-frequency transformer having a primary and a tuned secondary, means connecting the amplifier section of said tube to the primary of said transformer, and means connecting the diode section of said tube to the secondary of said transformer; the improvement which comprises the provision of means for neutralizing feedback, said neutralizing means comprising the connection of said transformer in a capacity-aiding sense to effect return of energy to the input grid of said tube through the diode anode-to-input grid interelectrode capacitance in such phase as to oppose the energy returned to said input grid through the plate-to-grid interelectrode capacitance, and means for so controlling the amount of energy returned through at least one of the said inter-electrode capacitances as to effect substantial neutralization of feedback.

2. In a radio receiver employing: a tube having a multi-grid radio-frequency amplifier section and a diode section within its envelope, a radio-frequency transformer having a primary and a tuned secondary, means connecting the amplifier section of said tube to the primary of said transformer, and means connecting the diode section of said tube to the secondary of said transformer; the improvement which comprises the provision of means for neutralizing feedback, said neutralizing means comprising the connection of said transformer in a capacity-aiding sense to effect return of energy to the input grid of said tube through the diode anode-to-input grid interelectrode capacitance in such phase as to oppose the energy returned to said input grid through the plate-to-grid interelectrode capacitance, and a resistance in the screen grid circuit of said tube between said screen grid and a point of radio-frequency ground potential for increasing the amount of energy returned through said plate-to-grid interelectrode capacitances to the extent necessary to effect substantial neutralization of feedback.

3. In a radio receiver having an intermediate-frequency stage which includes an input I.-F. transformer, an output I.-F. transformer, and a tube having a multi-grid I.-F. amplifier section and a diode section, means for tuning said input transformer and said output transformer to substantially the same frequency, means for connecting the secondary of said input transformer to the input grid of said tube, means for connecting the amplifier section of said tube to the primary of said output transformer, means for connecting the diode section of said tube to the secondary of said output transformer, said secondary of said output transformer being connected in a capacity-aiding sense with respect to said primary, and a resistance of predetermined value connected between the screen grid of said amplifier section and a point of substantially fixed potential at intermediate frequencies, said resistance being of such value that the several energies fed back through the several interelectrode-capacitance paths of said tube substantially counteract each other.

ROBERT C. A. ELAND.

REFERENCES CITED

The following references are of record in the file of this patent:

UNITED STATES PATENTS

| Number | Name | Date |
|---|---|---|
| 2,033,274 | Burton | Mar. 10, 1936 |
| 2,078,072 | Franks | Apr. 20, 1937 |
| 2,145,368 | O'Brien | Jan. 31, 1939 |